(12) United States Patent
Menzel et al.

(10) Patent No.: US 11,169,510 B2
(45) Date of Patent: Nov. 9, 2021

(54) ENGINEERING SYSTEM AND METHOD FOR PLANNING AN AUTOMATION SYSTEM

(71) Applicant: Siemens Aktiengesellschaft, Munich (DE)

(72) Inventors: Thomas Menzel, Langensendelbach OT Bräuningshof (DE); Michael Thomas, Fürth (DE)

(73) Assignee: Siemens Aktiengesellschaft, Munich (DE)

( * ) Notice: Subject to any disclaimer, the term of this patent is extended or adjusted under 35 U.S.C. 154(b) by 41 days.

(21) Appl. No.: 16/585,042

(22) Filed: Sep. 27, 2019

(65) Prior Publication Data
US 2020/0103866 A1 Apr. 2, 2020

(30) Foreign Application Priority Data
Sep. 28, 2018 (EP) .................................... 18197513

(51) Int. Cl.
*G05B 19/418* (2006.01)
*G05B 19/042* (2006.01)
*G05B 19/05* (2006.01)

(52) U.S. Cl.
CPC ..... *G05B 19/4185* (2013.01); *G05B 19/0426* (2013.01); *G05B 19/056* (2013.01)

(58) Field of Classification Search
CPC .............. G05B 19/0426; G05B 19/056; G05B 19/4185
See application file for complete search history.

(56) References Cited

U.S. PATENT DOCUMENTS

2010/0131104 A1* 5/2010 Brown ............... G05B 19/4185
700/275
2013/0211546 A1 8/2013 Lawson et al.
(Continued)

FOREIGN PATENT DOCUMENTS

CN 109716732 A * 5/2019 ........... H04L 67/125
DE 102015221650 5/2014

OTHER PUBLICATIONS

Langmann Reinhard et al: "Industrial Cloud: Status and Outlook", HMD. Praxis Der Wirtschaftsinformatik, vol. 52, No. 5, pp. 647-664, XP055335972, DE; ISSN: 1436-3011, DOI: 10.1365/s40702-015-0162-0; capture 6, Figures 7,8; 2015.

*Primary Examiner* — Chad G Erdman
(74) *Attorney, Agent, or Firm* — Cozen O'Connor (57) ABSTRACT

An engineering system for planning an automation system and method for planning the automation system, wherein a cloud environment and/or an edge device are integrated into a project structure of a planning environment, where the project structure includes components and has at least one hardware component that has project elements, where the integrating includes saving and displaying the cloud environment or the edge device, in a manner structured as a component, accordance to a technological hierarchy, and wherein project elements associated with the cloud environment and/or with the edge device are defined, where at least one program block and a device configuration are stipulated for the cloud environment or the edge device, and where the hardware component and the cloud environment and/or the edge device are via the planning to perform an automation task of the automation system that must partially be performed in the cloud environment and/or edge device.

21 Claims, 3 Drawing Sheets

(56) References Cited

U.S. PATENT DOCUMENTS

| | | | |
|---|---|---|---|
| 2014/0129688 A1* | 5/2014 | Asenjo | H04L 41/046 709/221 |
| 2015/0309492 A1* | 10/2015 | Patel | G05B 15/02 700/275 |
| 2017/0300037 A1* | 10/2017 | Platts | G06Q 50/04 |
| 2019/0050414 A1* | 2/2019 | Maturana | G06F 16/164 |
| 2020/0310394 A1* | 10/2020 | Wouhaybi | G05B 19/042 |

\* cited by examiner

ENGINEERING SYSTEM AND METHOD FOR PLANNING AN AUTOMATION SYSTEM

BACKGROUND OF THE INVENTION

1. Field of the Invention

The invention relates to a method for planning an automation system and to an engineering system for planning the automation system.

2. Description of the Related Art

In the industrial sphere and particularly in mechanical engineering, there is an increasing need to use applications in what is known as a cloud or on what are known as edge devices, which form an interface between installation components and a cloud. This involves analysis or monitoring or observation of a state of an installation component, in particular a machine state, being performed within the cloud or at least in part in the cloud and on edge devices based on technical information or information conditional upon operating states. The analysis or an evaluation performed in the cloud or on the edge device permits, for example, predictions about the durability of installation parts or about malfunctions that occur and simplifies in particular monitoring or maintenance of complex installations. By way of example, monitoring of a machine is simplified. As a result, it is possible to particularly achieve an increase in availability of an industrial installation or an increase in productivity of a machine.

Machine users or mechanical engineers can use what are known as applications in the cloud or on the edge device. Such applications range from programs in which simple display of operating states takes place to the use of complex methods, such as methods based on artificial intelligence. It normally holds that in particular higher-value applications must be developed specifically for one sector in industrial automation. By way of example, applications tailored specifically to one sector of mechanical engineering are of interest, which elaborate on machine types or production processes or individual machine elements of a mechanical engineering company. In particular, mechatronic or mechanical-engineering or process-engineering know-how needed for an application tailored to a user resides with a mechanical engineering company or Original Equipment Manufacturer (OEM) itself and, in particular, is moreover not supposed to be published as part of the intellectual property of the company. There is therefore a need to allow the generation, development or adaptation of applications or apps by including the know-how or knowledge of a mechanical engineering company or OEM of an automation system or with the collaboration of planning engineers or application programmers of the automation system.

The creation of applications by providers of automation solutions or cloud systems is widespread. Similarly, a user of an automation system often uses horizontal or sector-nonspecific IT providers, e.g., from the office IT sphere, to which sector-specific, machine-specific or process-specific know-how needs to be handed over in order to be able to develop applications tailored thereto.

SUMMARY OF THE INVENTION

In view of the foregoing, it is an object of the present invention to improve planning of an automation system or an engineering system intended therefor such that an automation task can be performed by including a cloud environment and/or an edge device.

This and other objects are achieved in accordance with the invention by a method for planning an automation system, having the steps of integrating a cloud environment and/or an edge device having the capability of connecting to a cloud environment into a project structure of a planning environment, where the project structure has components and has at least one hardware component having project elements, and where the integrating comprises saving and displaying the cloud environment or the edge device, in a manner structured as a component, in accordance with a technological hierarchy, and defining project elements associated with the cloud environment and/or with the edge device, where at least one program block and a device configuration are stipulated for the cloud environment or the edge device, and where the hardware component and the cloud environment and/or the edge device are designed via the planning to perform an automation task of the automation system that must in part be performed in the cloud environment and/or in the edge device.

A hardware component is understood to mean a component actually installed in the automation system, in particular a controller for the automation system. Similarly, the hardware component can be understood to mean a drive, for example. In particular when there are multiple hardware components, one component advantageously provided for is a controller including a processor, another is a drive and, for example, another is a motor.

A hardware component is listed or contained with the associated project elements in a project structure within a planning environment.

The planning environment therefore incorporates the at least one hardware component as an abstraction or model of a real device. The project elements of the hardware component are suitable for specifying or characterizing the hardware component. In particular, the project elements are used to save information about the hardware component, where the information relates, for example, firstly to real properties of the hardware component and relates, for example, secondly to a software representation of the hardware component.

A characteristic feature of the planning environment is also a technology hierarchy that can be modeled within the planning environment. In particular, a tree structure of the planning environment is graphically constructable or generable and also graphically discernible.

A cloud environment must be understood to mean a computing environment based on a capacity of a server, which is itself not necessarily part of the automation system. By way of example, it is an external server or a server intended for multiple automation systems collectively that is realized in one of the systems collectively using the server. If an automation system is connected to a cloud environment, then data of the automation system are made available to the cloud environment, or transmitted thereto, and processing of the data occurs in a manner relocated within the cloud environment. An edge device denotes a device connectable to the automation system and uses an interface to a cloud environment. In particular, preprocessing of the data to be transmitted to the cloud environment occurs on the edge device. By way of example, processing of the data also occurs on the edge device in advance, so that less computing capacity of the cloud environment needs to be consumed.

The cloud environment or the edge device are therefore incorporated into the project structure and the technological hierarchy thereof in the planning environment. To this end, project elements associated with the cloud environment and/or with the edge device are defined. The definition relates to at least one program block and a device configuration for the cloud environment or the edge device. Therefore, the cloud environment of the edge device are integrated into the project structure with associated project elements analogously to the integration of the hardware component with its project elements. The cloud environment or edge device are treated like a hardware device of the automation installation within the planning. The planning allows the performance of an automation task of the automation system that is implemented on a hardware component and a cloud environment, or a hardware component and an edge device, or a hardware component, an edge device and a cloud environment. At least in part, the automation task to be performed therefore occurs in the cloud or on the edge device. In the present disclosure, the term automation task therefore comprises firstly the core automation, for example, the automation provided for locally, comprising Programmable Logic Controller (PLC) programs and the action of sensors and actuators, and, further, also a value-add, provided via the opportunities for cloud integration, as part of the automation task. The proportional performance of the automation task in the cloud adds to or extends the core automation task and rounds off a whole automation task for the purposes of the application.

The inclusion of the automation steps to be performed on the cloud or the edge device involves the planning environment being used via the disclosed method by adding to the project structure around the cloud environment component realized outside the automation system analogously to a hardware component. Alternatively, in the case of an edge device provided for, the project structure around a virtual edge device is integrated by taking into consideration the functions realized by the edge device.

The planning of components and functionalities thereof that are themselves not part of the automation environment to be set up or planned in a conventional manner is advantageously effected, in accordance with the disclosed method, via conventional planning within an automation system. In particular, the planning can thus occur analogously to that for a hardware component, such as the controller of an automation installation. The planning of a hardware component within an automation system is normally part of the core skill of a planning engineer or application programmer of the automation system, such as a mechanical engineer. He can advantageously also use his capabilities, skills and know-how for planning the cloud environment or the edge device, because the planning therefor occurs in a manner integrated into the planning of the automation system. It is therefore advantageously possible for the available knowledge or know-how of end users, mechanical engineers or OEMs from control engineering to be used to implement automation tasks in conjunction with cloud solutions themselves.

In accordance with one embodiment, the at least one program block is used to stipulate an operating system for executing programs or applications on the cloud environment and/or on the edge device or a programming language for programming programs or applications for the cloud environment and/or the edge device. The program block therefore practically prescribes the software bases for the generation of cloud and edge applications.

In accordance with one embodiment, the programming language stipulated for programming programs or applications for the cloud environment and/or the edge device is a programming language for programs of the hardware component. In a particularly advantageous manner, the programming language simulated for programming the programs or applications in the cloud or on the edge device is a programming language that is also used to program the at least one hardware component. By way of example, this is an established piece of engineering software or PLC language, such as structured control language, (SCL), structured text (ST), or object orientated programming (OOP). The program block can further be used to choose an operating system for executing the programs or applications on the cloud or the edge device. Furthermore, the demand made on an instance of compilation of programs or applications created within the planning environment can be prescribed in an advantageous manner. In particular, a compiler or cross compiler is used that translates a PLC language used into a machine code that can be interpreted by the edge device or the cloud environment.

In accordance with another embodiment, the associated project element stipulated is further an operator control interface. In particular for automation projects with a cloud environment, the operating control interface is advantageously a project element. For the cloud environment, a user service of a user interface of the cloud is therefore able to be planned, for example. An operator control interface can be a project element for edge devices too. However, in instances of application, an edge device may also be in a form without a user interface that is planned or is programmed via the engineering system or the planning environment.

In accordance with another embodiment, the operator control interface stipulated is an operator control interface design tool that comprises a library of operator control elements. The operator control interface must also be understood to mean what is known as a user interface (UI). Design tools for user interfaces are in particular also called UI architects. By stipulating such an operator control interface design tool, it is possible to influence the operator control interface for programs or applications in the cloud environment or on the edge device in the planning environment of the automation system and in particular of the control installation.

In accordance with another embodiment, the operator control interface design tool stipulated is a tool of a hardware operator control interface of the hardware component. By way of example, a program such as WinCC is used with an associated library of operator control elements. As a result, the creation of the operator control interface of the cloud or edge application is advantageously rendered possible with the device for creating operator control interfaces for human/machine interfaces, which are in turn advantageously known to installation designers or installation operators.

In accordance with another embodiment, the device configuration for the cloud environment and/or the edge device is used to stipulate a device dimensioning, in particular a memory space dimensioning, or inputs and/or outputs or communication interfaces. Similarly to the device configuration of the hardware component, the device configuration for the cloud environment or the edge device is thus planned. The cloud environment and the edge device also have properties that can be included in the project structure as device properties. In an advantageous manner, the performance of the automation task on the cloud environment or via the edge device can be tailored to the device configuration thereof within the planning environment and using the device for planning the automation system. By way of example, this involves addresses being adapted, or an appropriate measurement range is chosen.

In accordance with yet another embodiment, further, a list of global symbols is stipulated for the cloud environment or the edge device. A list or collection or stock of global symbols is used, in illustrative terms, to stipulate which variables are relevant to a device. The list of global symbols is that data structure that is also used by translation programs, such as a compiler or an interpreter and that assigns statements and, hence, a meaning to a symbol in a source code. By way of example, a symbol describes what is known as an operand, such as an input or an output, and a symbolic name for this operand is allocated within the programming. The symbolic names are then saved in the list of global symbols, such as with the associated data type. A symbol table or tag list is known from the sphere of engineering in automation as such a list of global symbols. The symbol table is therefore, in an advantageous manner, likewise part of the project elements associated with the cloud environment or with the edge device besides the program block, the device configuration and the operator control interface.

In accordance with an embodiment, the list of global symbols comprises symbols representing variables of the cloud environment or of the edge device. By way of example, the symbols relate to signals that are exchanged with the cloud environment or the edge device and are used in a program or an application of the cloud environment or of the edge device.

In accordance with another embodiment, the list of global symbols further comprises symbols representing variables of the at least one hardware component. In a particularly advantageous manner, the same symbol table is used in the automation project and in the cloud application. This symbol table is extended by symbols relating to the cloud environment or the edge device. Therefore, a standard or consistent symbol table can be evaluated in the control system of the automation system and also in an application of the cloud environment or of the edge device. In an advantageous manner, there is direct access to state information of the automation project without a translation of the variables used or described in the automation project into the language or semantics of the cloud environment or of the edge device needing to be performed.

The variables within the symbol list can describe program variables or operator control interface variables, in this case. These can merely relate to the cloud environment or the edge device or may additionally also be program variables or operator control interface variables of the hardware component. Conventional variables of a symbol list that relate to the hardware component are, by way of example, what are known as PLC variables, names for sensors or actuators, in particular symbolic names, or variables for a communication, for example, a communication with a robot inside the automation system or outside the automation system.

In accordance with a further embodiment, the hardware component provided for is a control unit or a human/machine interface unit for a control unit. As a rule, there is provision in an automation system for at least one control unit that is intended to perform the automation task within the automation system, i.e., in the installation itself. In particular, only parts of the automation task are realized by the control unit. A further conventional hardware component within an automation system is a human/machine interface unit or human/machine interface (HMI). This is used to present or render accessible information relating to the automation system such that a user, i.e., a human being, can evaluate the information and if need be can likewise use the human/machine interface unit to input appropriate presets.

A control unit or a human/machine interface are part of the project structure in established automation systems and, in particular, have already been planned. The integration of the cloud environment or of the edge device can be adapted to the planning of a control unit or a human/machine interface unit as appropriate.

In accordance with a further embodiment, the project elements stipulated for the hardware component are a hardware program block, a hardware operator control interface, a hardware configuration and/or one or more hardware symbols.

In an advantageous manner, the associated project elements of the cloud environment and of the edge device are in a form in an analogous hierarchy and structure to the project elements of the hardware component, such as the program block of the hardware, the operator control interface of the hardware and the device configuration of the hardware.

In accordance with a further embodiment, the hardware program block is used to stipulate a set of algorithms for a signal processing in the hardware component and in particular to stipulate a programming language for programs of the hardware component. In a particularly advantageous manner, the same set of algorithms is used for creating the program block of the cloud environment or of the edge device as for creating the hardware program block. The creation in this case comprises programming, testing, debugging, optimizing, compiling or loading into a target environment. Similarly, a standard programming language is used in an advantageous manner. A hardware operator control interface is provided, for example, via established HMI planning in the engineering system, where there is in particular provision for a library of operator control elements that can be used to cause specific presentation or appearance of information, for example, on an operator control panel of the automation system. By way of example, the presentation of limit value violations is displayed via luminous displays for the activated buttons or the like. An analogous approach for the presentation or for the appearance of information within an application in the cloud environment or on the edge device is advantageously possible in a particularly simple manner if the operator control interface of the cloud environment or of the edge device is stipulated in the same manner as those of the hardware component. By way of example, the tool used for programming the operator control interface is the same user interface architect.

It is also an object of the invention to provide an engineering system for planning an automation system, where the engineering system is configured to integrate a cloud environment and/or an edge device having the capability of connecting to a cloud environment into a project structure of a planning environment, where the project structure has components and has at least one hardware component having project elements, and where the integrating comprises saving and displaying the cloud environment and/or the edge device, in a manner structured as a component, in accordance with a technological hierarchy, and to define project elements associated with the cloud environment and/or with the edge device, where at least one program block and a device configuration are stipulable for the cloud environment and/or the edge device, and where the hardware component and the cloud environment and/or the edge device are designed via the planning in the engineering system to perform an automation task of the automation system that must in part be performed in the cloud environment (10) and/or in the edge device.

In accordance with one embodiment, the definable associated project elements are, further, an operator control interface and/or a list of global symbols.

In accordance with one embodiment, the engineering system is further configured to perform planning in accordance with one of the above-disclosed embodiments.

It is also an object of the invention to provide a non-transitory computer-readable medium (i.e., a computer program product) having a computer program that has program code instructions for performing the method described above when the computer program is executed on a program controlled device including a processor.

A computer program product, such as a computer program means, can be provided or delivered, for example, as a storage medium, such as a memory card, USB stick, CD-ROM, DVD, or else in the form of a downloadable file from a server in a network. This can be effected, e.g., in a wireless communication network by transferring an appropriate file having the computer program product or the computer program means. A possible program controlled device is in particular a control device, such as also a microprocessor.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention is explained more specifically below on the basis of exemplary embodiments in the figures, in which.

DETAILED DESCRIPTION OF THE EXEMPLARY EMBODIMENTS

Figure 1:
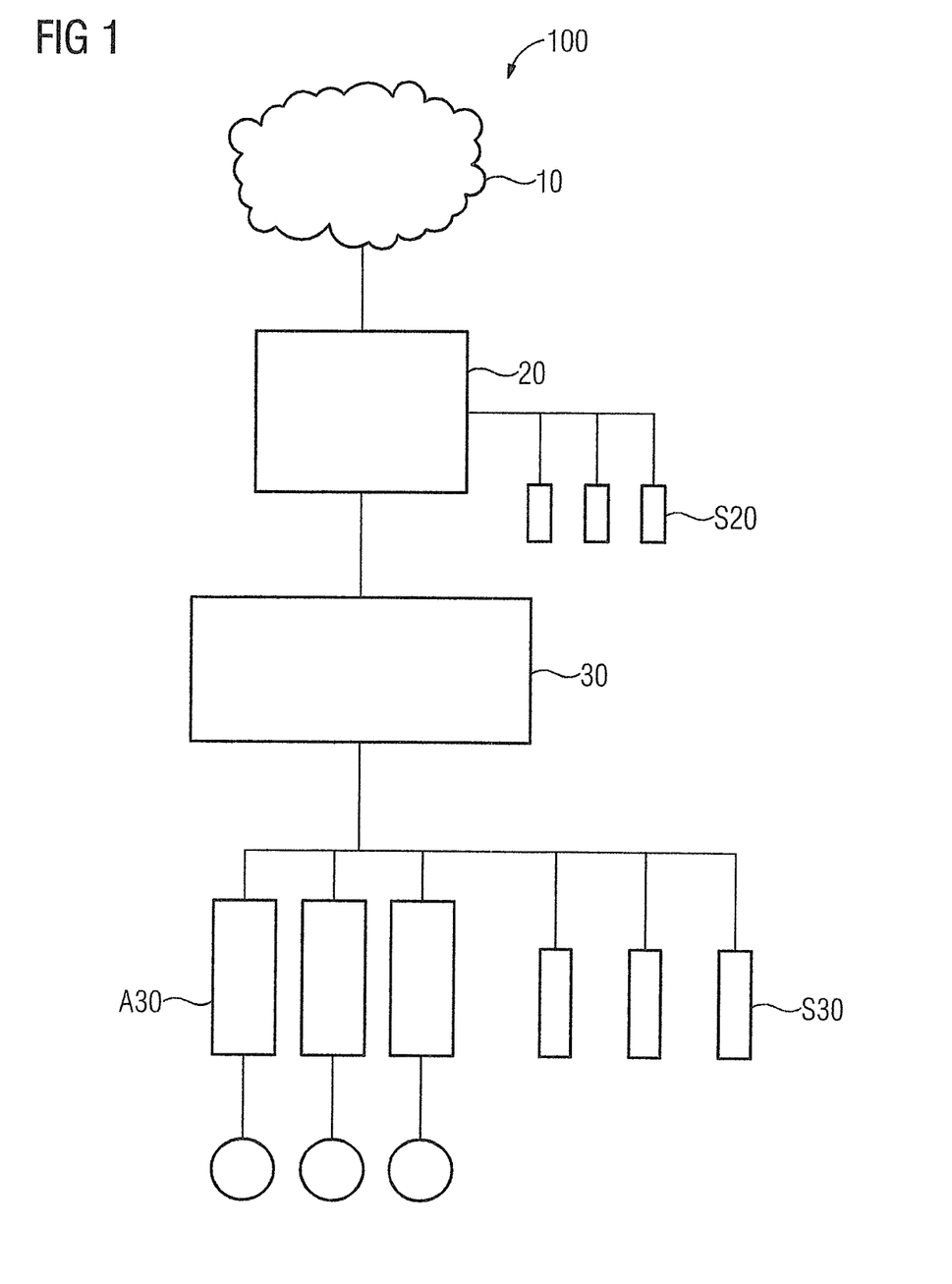
FIG. 1 shows a schematic depiction of an automation system having an edge device and a cloud environment in accordance with the invention.

To illustrate the planning of an automation system 100, FIG. 1 schematically depicts the architecture of the automation system 100. As a centerpiece, the automation system 100 contains a hardware component 30 that is in the form of a controller. The controller 30 is for example a Programmable Logic Controller (PLC) and controls an automation process, such as a filling process within a filling installation. To this end, the controller 30 has sensors S30, such as temperature sensors, encoders or vibration sensors. Moreover, the controller 30 has actuators A30, consisting in particular of converters and motors, where the motors move one or more axes. The architecture contains a cloud environment 10, depicted figuratively above the controller 30. Within this cloud environment 10 or cloud 10, subtasks of the entire automation system 100 can be performed in a relocated manner. By way of example, an evaluation of data from the sensors S30 occurs in the cloud 10. By way of example, the cloud 10 makes it possible for data captured in the installation of the automation system 100 to be evaluated by comparison with a large number of data from other automation installations. Often, there is provision for what is known as an edge device 20 for the purposes of preprocessing data captured in the automation installation. This edge device 20 forms an interface into the cloud environment 10, at the same time. By way of example, the edge device 20 processes the data by virtue of filtering occurring and only specific data being sent on into the cloud environment. By way of example, the edge device 20 has further sensors S20. By way of example, Bluetooth sensors communicate directly with the edge device 20. Therefore, the monitoring of an installation with sensors for wear or optimization or the like does not encumber the automation itself, because a communication occurs via a separate path directly to the edge device 20.

Conventionally, the required skills for setup or planning are substantially hardware-specific solutions, such as drive control charge (DCC), for the actuator level, solutions and knowledge surrounding what is known as engineering of control installations on the controller level, for example the TIA portal of the Siemens company and the control programs therefor with languages such as Structured Control Language (SCL) or Structured Text (ST), and finally solutions stemming from the IT sphere for the cloud level or the edge and cloud levels.

By way of example, the programming of an edge device conventionally requires knowledge of programming languages such as C or C# or C++, for instances of an edge device being realized in a Linux environment. The planning of the cloud, or of web applications, which a user of a cloud service wishes to prescribe himself often also requires skills in web application programming, for example, via the languages Visual Code or Visual Studio or Java. Here, the focus of skill for installation operators is often on a demanding area of planning for control and for actuators.

Figure 2:
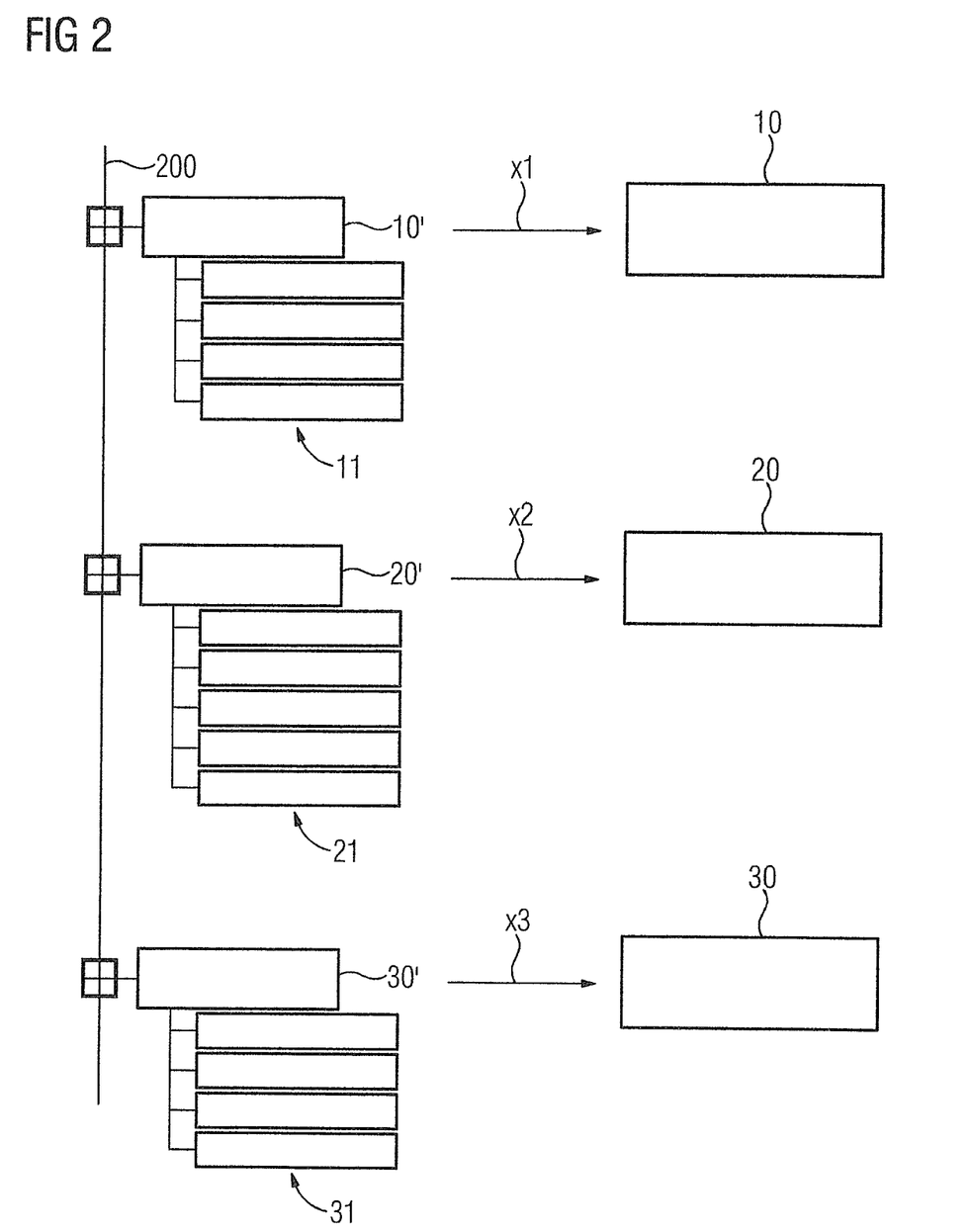
FIG. 2 shows a schematic depiction of a project structure of an automation system in accordance with an exemplary embodiment of the invention.

FIG. 2 shows, schematically and by analogy with the architecture as depicted in FIG. 1, the components of the cloud environment 10, of the edge device 20 and of the hardware component 30 in the form of a controller in a planning environment. FIG. 2 depicts how the real components cloud environment 10, edge device 20 and controller 30, as are part of the automation system 100, are modeled in a project structure 200. Here, the project structure 200 comprises a project tree having individual components 10', 20', 30' and a substructure arranged below the respective component.

A component 30' models the controller 30 in the project structure 200, for example. In a planning environment, features of the controller 30 are saved or stored with an associated classification in the project structure 200 and are presentable in the project structure 200 via a user interface of the planning environment. Project elements 31 of the controller 30 are presentable as a substructure for the component 30'.

In an advantageous manner, the project structure 200 is extended using the proposed planning method. Besides hardware components already engineered via a planning environment in the conventional automation sphere, components that represent a cloud environment 10 directly or an edge device 20, which is the connection of the cloud environment 10, are now also supposed to be integrated into the project structure 200. To this end, a component 10' for representing the cloud environment 10 in the planning environment is proposed. In the case of an edge device 20 provided for in the automation installation, the device is taken into consideration either as an alternative to the cloud environment 10 or in addition to the cloud environment 10 by virtue of a component 20' forming the representation of the edge device 20 in the planning environment. Both the component 10' modeling the cloud environment 10 and the component 20' which, if present, models the edge device 20, each have a structure, in the standard format known from the conventional automation project, which features the associated project elements 11, 21 saved and presentable in the planning environment as a substructure for the respective component 10', 20'.

The planning environment with the stipulable project structure 200 performs the basis for the planning of the automation system 100, which also comprises or can perform tasks that are processed in their cloud. In a standard manner and in the usual environment of the planning of the controller and in particular further hardware components of the automation system, it is therefore additionally possible for the planning of cloud components, in particular a cloud environment 10 or an edge device 20, to occur. In particular, the creation or development of applications used in the cloud occurs in this manner. By way of example, the planning environment can be used to prescribe an application that is presented on a user interface of the cloud environment 10 and, for example, is used for utilizing or adapting services of the cloud service.

In a particularly advantageous manner, the project elements are developed in the planning environment by using the means or languages of the conventional control system planning. By way of example, the TIA portal of the Siemens company is used. Other engineering platforms are also advantageously usable therefor. By way of example, programming languages such as SCL or object-oriented languages such as Object Oriented Programming (OOP) are used to create algorithms that are executed in the cloud environment 10. A user interface of an application in the cloud environment 10 is also creatable using the same means as are conventionally used to plan the HMI, i.e., the human/machine interface of the controller. By way of example, it is possible for WinCC to be used.

In cases in which there is provision for an edge device 20, the hardware thereof, such as sensors associated with the edge device 20, can be configured in accordance with the conventional hardware of the automation system 100. Similarly, virtual hardware, such as the virtual hardware of the cloud environment 10, can be provided in a known manner.

In the project structure of the conventional automation engineering software, the cloud environment 10, or the edge device 20, is used practically as a new device 20', or virtual device 10'. Programs and operator control surfaces can be developed and filed away for cloud applications, or edge applications, where it is possible to resort to existing knowledge in control engineering in an advantageous manner.

The programs or applications and operator control masks or operator control surfaces created in the planning environment are finally translated for the different platforms that the automation system has. By way of example, applications that have been developed for the cloud environment 10, for example, the Mindssphere system from the Siemens company, are translated via a compiler x1 or Cross Compiler. A "PLC language" that has been used to generate the Apps is thus converted into compiled code, for example, or into interpretable code such as Java, provided appropriate runtime environments are available on the target platform. Analogously, program code created for applications on the edge device 20 is compiled using a compiler x2. Herein, compilation into an edge code 20, for example, likewise occurs or a code interpretable by the edge device 20 is used. The programs and operator control masks that have been generated for the controller 30 are translated in a conventional manner, for example, for a controller from the Siemens company via a standard compiler x3, which compiles in what is known as an S7 code. Therefore, allowance can be made for the runtime environments of the target systems used, for example, the hardware and operating system thereof.

The use of engineering software for automation devices for creating applications for cloud solutions encompasses methods and functions for testing and debugging, for example via functions such as what are known as watch tables, breakpoints, traces or online connections for the target system for loading and at runtime.

The base project elements stipulated for the model 10' of the cloud environment 10 or the model 20' of the edge device 20 are each at least a program block and a device configuration. For the model 10' of the cloud environment 10, an operator control interface is additionally stipulated. If there is provision for an edge device 20 in the automation system, then the project elements 11, 21 both for the component edge device 20' and for the component cloud environment 10' are advantageously defined as a virtual device in the project structure. The respective program block allows the setup of programs or algorithms that stipulate the scope of functions of a cloud application. By way of example, the algorithm programmed via the program block is used to generate an application that gives rise to a data evaluation tailored specifically to the automation system in the cloud environment 10 or proportionally in the cloud environment 10 and on the edge device 20. The algorithm in the program block is advantageously saved in the language of the controller or is created in this language in an engineering phase.

The operator control interface or user interface stipulated in the program elements is advantageously the same operator control interface tool as is also used for the controller. By way of example, the HMI planning of the controller and the logic and language thereof is thus also used to generate the user interface of the cloud or edge applications.

Finally, the base element stipulated for the planning features associated with the cloud environment 10 or with the edge device 20 is, further, a device configuration. Analogously to the device configuration created in the automation engineering software for the hardware component 30, a practically virtual hardware configuration is also generated for the cloud environment 10 or the edge device 20. Advantageously, the hardware properties of the cloud environment 10 or of the edge device 20 are saved in the project structure 200. In particular a device dimensioning or memory space dimensioning is set up here. Further, input/outputs or communication interfaces of the edge device 20 can also advantageously be stipulated.

In an advantageous manner, a symbol list or symbol table or tag list is used in the various components in a standard manner. That is, for example, variables that have been created or defined via the symbol list of the controller within the context of the control device are also used in the project elements of the component 10' as a representation of the cloud environment 10 in the programming environment with the same meaning. A symbol table can therefore be used in an advantageous manner for evaluations in the control system and in the cloud application. In particular, the symbol table associated with the cloud environment 10 is extended by specific variables of the cloud environment. Direct access to state information of the automation project is therefore possible in an advantageous manner within the cloud application.

As a further advantage, data consistency, in particular vertically, is possible in an improved way. In particular, the semantics of the symbols are easier to handle when symbol tables are consistent.

Similarly, the symbol table of the component 20', which models the edge device in the project structure, can also be concordant with the symbol table of the controller 30 or have concordant symbols or variables. Therefore, analogously to the explanations in regard to the symbol list of the cloud environment 10, the same advantages can be achieved for applications that run on the edge device 20.

In the automation system in which there is provision for an edge device, both the edge device 20 and the cloud environment 10 are modellable in the project structure 200 as component 20', 10' with the associated project elements in an advantageous manner. The cloud environment 10 is then modeled practically as a virtual device.

The disclosed embodiments of the invention allow the inclusion of a cloud environment and possibly additionally an edge device in an automation project for the purposes of planning applications that are executed in the cloud environment, or in the cloud environment and on the edge device during operation of the automation system. Algorithms and user interfaces of the cloud or edge applications are particularly advantageously made possible using the same methods and the same appearance or the same usability as for the planning or engineering of an ordinary hardware component of the automation system, such as in particular a PLC. Control-specific knowledge of an installation operator is therefore also usable for applications in the cloud, in particular for generation or setup thereof.

Figure 3:
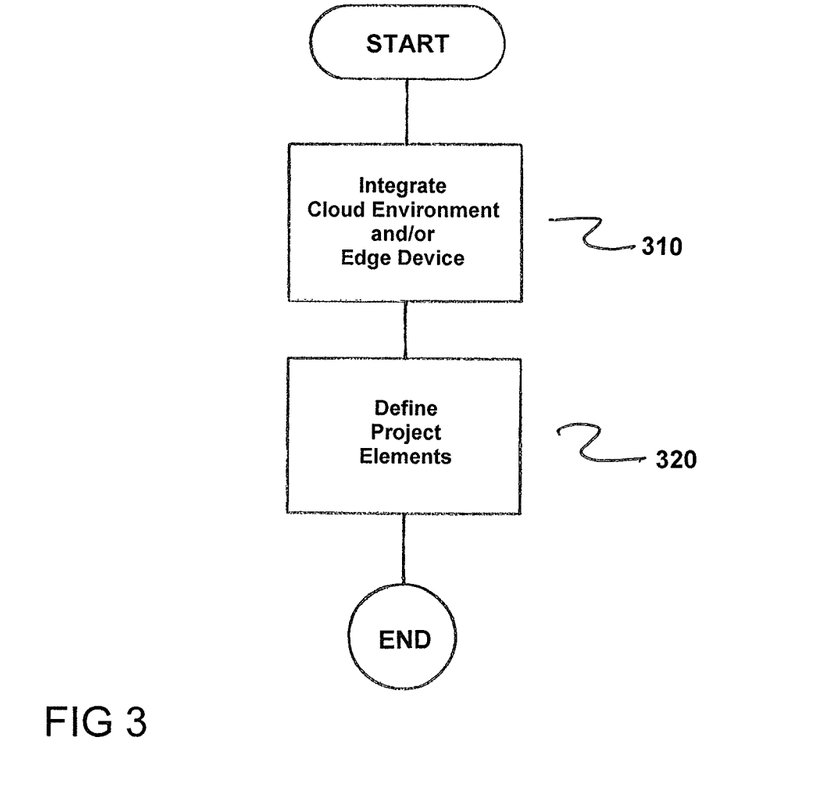
FIG. 3 is a flowchart of the method in accordance with the invention.

FIG. 3 is a flowchart of the method for planning an automation system 100. The method comprises integrating, into a project structure 200 of a planning environment, at least one of (i) a cloud environment 10 and (ii) an edge device 20 having a capability to connect to a cloud environment 10, as indicated in step 310. In accordance with the invention, the project structure 200 includes components 10', 20', 30' and includes at least one hardware component 30 having project elements (31). Here, the integration comprises saving and displaying one of (i) the cloud environment 10 and (ii) the edge device 20, in a manner structured as a component 10' 20', in accordance with a technological hierarchy.

Next, project elements 11, 21 associated with at least one of (i) the cloud environment 10 and (ii) the edge device 20 are defined, as indicated in step 320. In accordance with the invention, at least one program block and a device configuration being stipulated for at least one of (i) the cloud environment and (ii) the edge device, and at least one of (i) the hardware component 30 and the cloud environment 10 and (ii) the edge device 20 are designed via planning to perform an automation task of the automation system 100 that must in part be performed within at least one of (i) the cloud environment 10 and (ii) the edge device 20.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for planning an automation system, the method comprising:
    integrating, into a project structure of a planning environment of the automation system, at least one of (i) a cloud environment and (ii) an edge device having a capability to connect to a cloud environment, the project structure including components and including at least one hardware component having project elements, and said integrating comprises saving and displaying one of (i) the cloud environment and (ii) the edge device, in a manner structured as a component, in accordance with a predefined hierarchy;
    defining project elements associated with at least one of (i) the cloud environment and (ii) the edge device, wherein at least one program block and a device configuration are stipulated for at least one of (i) the cloud environment and (ii) the edge device, and wherein at least one of (i) the hardware component and the cloud environment and (ii) the edge device are designed via planning to perform an automation task of the automation system which must be partly performed within at least one of (i) the cloud environment and (ii) the edge device; and
    performing the automation task of the automation system partly within at least one of (i) the cloud environment and (ii) the edge device.

2. The method as claimed in claim 1, wherein the at least one program block is utilized to stipulate one of:
    (A) an operating system for executing programs or applications on at least one of (i) the cloud environment and (ii) the edge device, and
    (B) a programming language for programming programs or applications for at least one of (i) the cloud environment and (ii) the edge device.

3. The method as claimed in claim 2, wherein the programming language stipulated for programming programs or applications for at least one of (i) the cloud environment and (ii) the edge device comprising a programming language for programs of the at least one hardware component.

4. The method as claimed in claim 1, wherein a stipulated associated project element comprises an operator control interface.

5. The method as claimed in claim 4, wherein the stipulated operator control interface comprises an operator control interface design tool that comprises a library of operator control elements.

6. The method as claimed in claim 5, wherein the stipulated operator control interface design tool comprises a design tool of a hardware operator control interface of the at least one hardware component.

7. The method as claimed in claim 1, wherein the device configuration for at least one of (i) the cloud environment and (ii) the edge device stipulates one of a device dimensioning, inputs and/or outputs and communication interfaces.

8. The method as claimed in claim 1, wherein the dimensioning comprises a memory space dimensioning.

9. The method as claimed in claim 1, further comprising: stipulating a list of global symbols for one of (i) the cloud environment and (ii) the edge device.

10. The method as claimed in claim 9, wherein the list of global symbols comprises symbols representing variables of one of (i) the cloud environment and (ii) the edge device.

11. The method as claimed in claim 9, wherein the list of global symbols further comprises symbols representing variables of the at least one hardware component.

12. The method as claimed in claim 10, wherein the list of global symbols further comprises symbols representing variables of the at least one hardware component.

13. The method as claimed in claim 1, wherein the at least one hardware component comprises one of (i) a control unit and (ii) a human/machine interface unit for the control unit.

14. The method as claimed in claim 1, wherein the project elements stipulated for the hardware component comprise at least one of (i) a hardware program block, (ii) a hardware configuration and (iii) at least one hardware symbol.

15. The method as claimed in claim 14, wherein the hardware program block is utilized to stipulate a set of algorithms for a signal processing in the at least one hardware component.

16. The method as claimed in claim 15, wherein the set of algorithms comprise a programming language for programs of the hardware component.

17. An engineering system for planning an automation system, comprising:
   at least one hardware component; and
   an edge device including sensors;
   wherein the engineering system is configured to:
      integrate, into a project structure of a planning environment of the automation system, at least one of (i) a cloud environment and (ii) the edge device which is connectable to the cloud environment, wherein the project structure includes components and includes the at least one hardware component which has project elements, said integration comprising saving and displaying at least one of (i) the cloud environment and (ii) the edge device, in a manner structured as the component, in accordance with a predefined hierarchy; and
      define project elements associated with at least one of (i) the cloud environment and (ii) the edge device, wherein at least one program block and a device configuration are stipulated for at least one of (i) the cloud environment and (ii) the edge device, and wherein at least one of (i) the at least one hardware component and the cloud environment and (ii) the edge device are designed via the planning in the engineering system to perform an automation task of the automation system which must be partly performed in at least one of (i) the cloud environment and (ii) the edge device; and
      wherein the automation task of the automation system is partly performed within at least one of (i) the cloud environment and (ii) the edge device.

18. The engineering system as claimed in claim 17, wherein definable associated project elements comprise at least one of (i) an operator control interface and (ii) a list of global symbols.

19. The engineering system as claimed in claim 17, wherein the engineering system is further configured to utilize the at least one program block to stipulate one of:
   (A) an operating system for executing programs or applications on at least one of (i) the cloud environment and (ii) the edge device, and
   (B) a programming language for programming programs or applications for at least one of (i) the cloud environment and (ii) the edge device.

20. The engineering system as claimed in claim 18, wherein the engineering system is further configured to utilize the at least one program block to stipulate one of:
   (A) an operating system for executing programs or applications on at least one of (i) the cloud environment and (ii) the edge device, and
   (B) a programming language for programming programs or applications for at least one of (i) the cloud environment and (ii) the edge device.

21. A non-transitory computer readable medium encoded with a computer program which, when executed by a processor of a program-controlled device, causes planning of an automation system, the computer program comprising:
   program code for integrating, into a project structure of a planning environment of the automation system, at least one of (i) a cloud environment and (ii) an edge device having a capability to connect to a cloud environment, the project structure including components and including at least one hardware component having project elements, and said integrating comprises saving and displaying one of (i) the cloud environment and (ii) the edge device, in a manner structured as a component, in accordance with a technological hierarchy;
   program code for defining project elements associated with at least one of (i) the cloud environment and (ii) the edge device, wherein at least one program block and a device configuration are stipulated for at least one of (i) the cloud environment and (ii) the edge device, and wherein at least one of (i) the hardware component and the cloud environment and (ii) the edge device are designed via planning to perform an automation task of the automation system which must be partly performed within at least one of (i) the cloud environment and (ii) the edge device; and
   program code for performing the automation task of the automation system partly within at least one of (i) the cloud environment and (ii) the edge device.

* * * * *